Feb. 22, 1927.

J. C. GLYNN

POULTRY ROOST

Filed Aug. 20, 1926

1,618,186

Inventor
JOSEPH C. GLYNN
By Paul, Paul + Moore
ATTORNEYS

Patented Feb. 22, 1927.

1,618,186

UNITED STATES PATENT OFFICE.

JOSEPH C. GLYNN, OF MINNEAPOLIS, MINNESOTA.

POULTRY ROOST.

Application filed August 20, 1926. Serial No. 130,543.

The object of my invention is to provide a simple inexpensive form of roost that is adapted for catching mites or poultry vermin without the use of any extraneous attachment or fixture on the roost.

The device is designed conformably to that habit or urge of vermin, which causes them to seek a hiding place or nest by crawling upwardly. For this reason, I provide bores as nests leading upwardly from the bottom of the roost, and I arrange these bores to communicate with relatively shallow runways. The arrangement is such that entrance to the nest is had laterally from one side of the runways. The depth of the bores which provide the nest is greater than the depth of the grooves which provide the runways, so that vermin traveling in the runway are attracted by the darker appearance of the entrances of the nests, and can, after entry thereinto, travel upwardly, as is their wont.

A further object is to provide a roost having means for catching the mites and vermin and capable of being cleaned or freed from the accumulation of mites and vermin therein by the simple application of hot water thereto.

Other objects of the invention will appear from the following detailed description.

The invention consists generally in various constructions and combinations all as hereinafter described and particularly pointed out in the claims.

In the accompanying drawings forming part of this specification,

Figure 1:
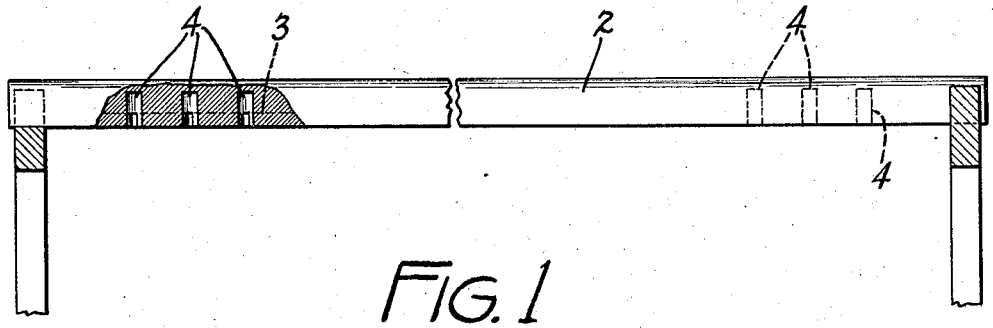
Figure 1 is a view of a poultry roost showing the means formed therein for collecting the mites or vermin.
Figure 2:
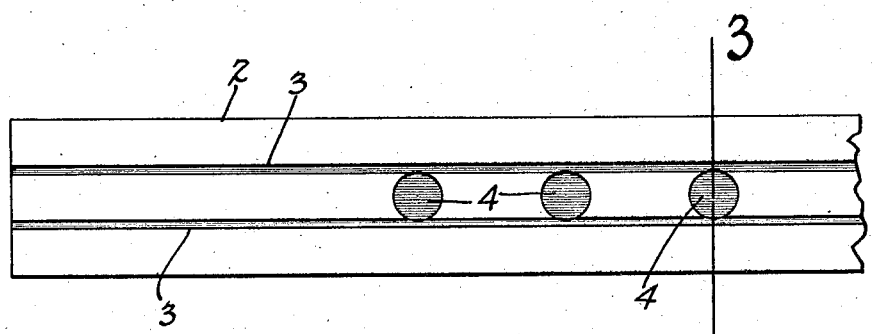
Figure 2 is a longitudinal sectional view showing how the runways formed in the under side of the roost communicate with the wells or pockets arranged vertically therein.
Figure 3:
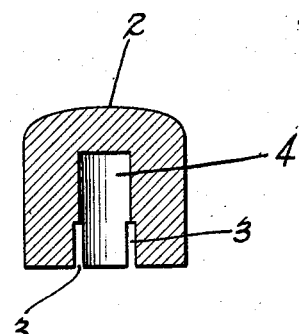
Figure 3 is a transverse sectional view showing the relative depth of the runways and pockets or wells formed in the under side of the roost.

In the drawing, 2 represents a poultry roost made preferably of wood of varying lengths as may be desired, and having a rounded upper surface. In the under side of the roost, I provide narrow longitudinal grooves or runways 3 formed by a suitable tool, such as a saw in the flat under surface of the roost. These runways are spaced apart in substantially parallel relation and the wall of the roost between these runways is provided with groups of vertical pockets or wells 4 formed by boring into the under surface of the roost. As shown in the drawing, there are preferably three wells or pockets in each group spaced apart a suitable distance, with a group adjacent each end of the bar. These wells or bores, cut the walls of the grooves 3, so that entrance to the bores may be had through the openings formed as a result of the intersection. The well may communicate with either runway as desired, or with both. These wells are of a suitable depth and diameter and I found from actual test of the device that the mites and other vermin will move along the runways and enter the wells climbing vertically therein. After a short time, the wells will fill with mites or other vermin. An application of scalding water is then made to the under side of the roost killing the mites in the runways and in the wells, and washing them out of the wells or runways and thoroughly cleansing the walls thereof. It will be understood that the runways may be made of any suitable depth.

It will be understood that the roosts may be made of different length and that the wells or pockets may be of any suitable depth and diameter and there may be as many of them in a group as seems desirable.

The mites entering the runways will pass along therein to the wells or pockets and quickly fill these pockets and at that time the roosts may be removed and an application of scalding water will not only destroy the mites but will wash them out of the wells and runways. The roost is then in condition to be put back for use.

The bores are arranged to cut the side walls of the grooves in a manner to form entrance openings, in this case, vertically elongated, or elongated in a direction from bottom to top of the roost, with the openings leading from a side wall of the groove into the bores, and being of a length equal to the depth of the groove. In some instances, one bore will communicate with the adjacent runway only on one side, while another bore may communicate with the runway only at the other side. However they are arranged, the essential feature of the construction is that the bores cut the passageways to form entrance openings.

I am aware that traps of this kind have been made, but they are composed of two parts, and generally the trap is separable. This is objectionable because the vermin fall off when the trap is removed to be cleaned.

I claim as my invention:

1. A bar having a groove, and an opening cutting a side wall of the groove, to provide a lateral entrance opening, said opening and groove leading upwardly from the bottom of the bar.

2. A bar having grooves in its bottom forming comparatively narrow passageways, and bores cutting a side wall of the grooves and extending inwardly beyond the bottom of the grooves, to form nests leading upwardly therefrom.

3. A bar having grooves in its bottom forming comparatively narrow passageways and bores cutting and extending inwardly beyond the bottom of the grooves to form nests leading upwardly therefrom, said bores cutting said grooves.

4. A bar having a groove to form a comparatively narrow passageway, and a plurality of bores cutting and extending inwardly beyond the bottom of the groove to form nests leading upwardly from the passageway, said bores being arranged in groups.

5. A bar having a groove to form a comparatively narrow passageway, and a plurality of bores cutting and extending inwardly beyond the bottom of the groove to form nests leading upwardly from the passageway, said bores being arranged in groups, a group adjacent each end of the bar.

6. A roost bar having a groove extending the full length thereof to form a comparatively narrow and shallow passageway opening downwardly when the roost bar is in operative position, and a plurality of bores cutting and extending inwardly beyond the bottom of the groove to form nests leading upwardly from the groove, the intersection of the bores with the groove being such, that entrance to the bore may be had laterally from the groove.

7. A roost bar having a groove in the bottom of the bar and extending the full length thereof to form a comparatively narrow and shallow passageway opening downwardly when the roost bar is in operative position, and a plurality of bores cutting and extending inwardly beyond the bottom of the groove to form nests leading upwardly from the groove, said bores being of greater diameter than the width of the groove.

8. A roost bar having a pair of grooves extending the full length thereof to form comparatively narrow and shallow passageways opening downwardly when the roost bar is in operative position, and a plurality of bores cutting and extending inwardly beyond the bottom of the groove to form nests leading upwardly from the groove, with the bores cutting the side walls of the grooves in a manner to form entrance openings leading from the side wall of the grooves into said bores.

In witness whereof, I have hereunto set my hand this 16th day of August 1926.

JOSEPH C. GLYNN.